Patented Sept. 21, 1948

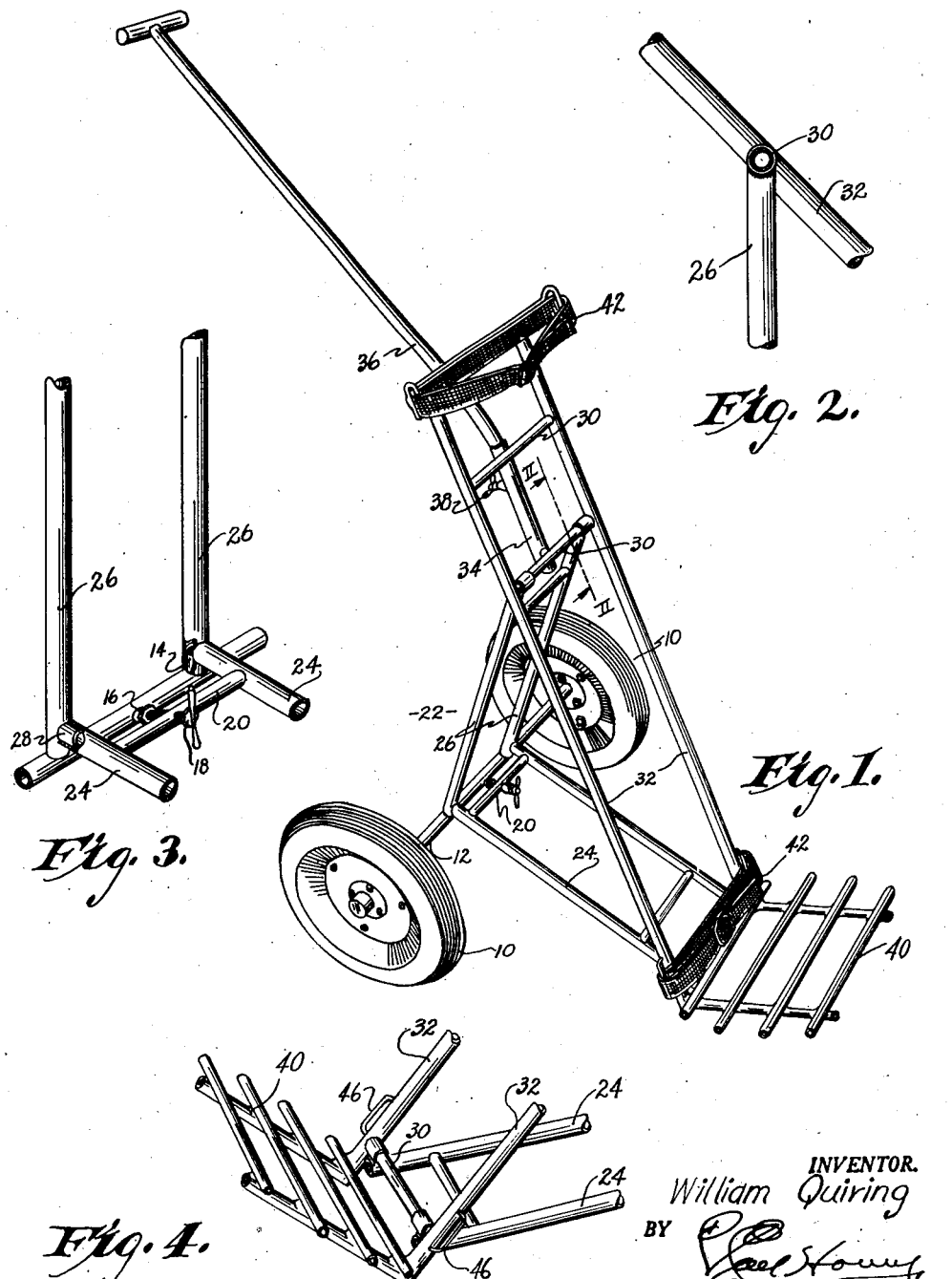

2,449,910

UNITED STATES PATENT OFFICE 2,449,910

FOLDING GOLF CLUB CART

William Quiring, Wichita, Kans., assignor to Quiring-Owston, Inc., Wichita, Kans., a corporation of Kansas Application November 5, 1945, Serial No. 626,593

3 Claims. (Cl. 280—36)

This invention relates to carts of the hand push and pull type and the primary aim is to provide a vehicle for golf club bags or the like that is capable of being moved about by the game player for the purpose of having accessible the various golf clubs.

Another primary aim of the invention is the provision of such a cart that may be fully collapsed to a compact bundle when not in use.

Further objects of the invention include the specific structural details built into the framework of the cart; the manner in which the bed of the cart is maintained at an angle of inclination when the same is not being pulled along over the ground; the arrangement of parts into a group of independent units, all of which may be combined in a package for storage or transportation; and the instrumentalities through the medium whereof the units are quickly assembled.

Other objects of the invention will appear during the course of the following specification referring to the accompanying drawing, wherein:

Fig. 1 is a perspective view of a golf club cart made in accordance with the present invention.

Fig. 2 is an enlarged fragmentary detailed sectional view taken on line II—II of Fig. 1 and looking in the direction of the arrows.

Fig. 3 is a detailed fragmentary perspective view of the zone of juncture between the framework and axle of the wheel unit, and Fig. 4 is a perspective fragmentary view of the lower portion of the bed at its zone of juncture with a part of the framework.

It has become a prevailing habit for golfers to transport their own bag of clubs over the course in lieu of using a caddy. The cart made pursuant to this invention is capable of being drawn from place to place on the golf course with speed and dispatch and is further capable of assuming an upright position when the handle is released to the end that the clubs in the golf bag are accessible and held in operative position without danger of escaping from the bag.

One of the prime requisites of a cart of the character above mentioned is that it be capable of collapsing to a condition where it may be transported in an automobile or in the trunk of a car and further, may be stored away when not in actual use.

All of the desirable features just enumerated and the objects above defined, are fulfilled when a cart made as illustrated, is produced. The preferred embodiment of the invention has been chosen for illustration and since it is obvious that a golf bag may be quickly mounted in place on the cart, such an item has not been shown.

The numeral 10 designates the wheels of a unit comprising axle 12 and wheels 10. This unit is completely removable from association with the remaining structure of the cart. The axle has a pair of stubs 14 near the center thereof and further is provided with a fixture 16 into which a manually manipulable clamping screw 18 may be moved when the parts of the cart are to be clamped together. This screw 18 is rotatably mounted on a tie rod 20 forming a part of framework 22 which comprises a substantially horizontal portion 24 and a normally substantially vertical portion 26. This framework is constructed of tubular material and the proximal ends of portions 24 and 26 are releasably held together through the medium of pintles 28 extending laterally from each of the tubular members comprising portion 26. The portions 24 and 26 diverge from their zone of juncture toward cross rods 30 of like character forming a part of bed 32 and the ends of these said portions are hingedly attached to cross rods 30. Since the loosening of screw 18 will allow disengagement of the ends of portions 24 and 26 and likewise removal of the ends of tubular members forming portion 26 from stubs 14, these said portions 24 and 26 may be swung into overlapping relation and to positions in substantially the same plane as the two members 32 of the bed. This action occurs when folding of the cart is desired. A third cross rod 30 near the normally upper end of bed 32 cooperates in supporting a socket 34 which receives one end of handle 36. When handle 36 is in the position shown in Fig. 1, a set screw 38 is tightened thereagainst to preclude accidental removal. When handle 36 is to be associated with the remaining parts of the cart in the folded condition, this handle lies on cross rods 30 and in substantially the same plane as the side members of bed 32.

Bed 32 has a laterally projected integral platform generally designated by the numeral 40 at its lower end and this platform serves as a seat for the bottom of the golf bag. When in the position with its bottom placed upon the platform 40, the golf bag lies against the bed 32 and straps 42 are drawn around the golf bag to prevent its falling from place. The form of framework 22 is such as to dispose the major portion of the weight of bed 32 and its supported golf bag or other article to one side of axle 12. When the handle 36 is released therefore, bed 32 will drop down to a position where the lower end of the bed and part of platform 40 rests upon the ground to prevent the wheels from rolling and to hold the entire assembly in a fixed position. When the cart is in the assembled, operative position, as illustrated in Fig. 1, tightening of screw 18 will not only draw the ends of tubular members of portion 24 into tight engagement with pintles 28 on tubular members of portion 26, but these tubular portions 26 will be drawn into tight engagement with stubs 14 on axle 12. Thus an easily broken joint is established and but a single manually manipulable member is employed to establish the connections.

In practice the material from which the cart is made comprises aluminum tubing or the like and a cart of extremely light weight is the result.

Straps 42 are mounted on bed 32 through the medium of loops 46 shown in detail in Fig. 4. The bed members 32 are in an inclined position when portions 24 and 26 are substantially horizontal and vertical respectively and when in such position, the upper end of the bag lies forwardly of a plane passing through axle 12 and longitudinally thereof, while the bottom of the bag is to the other side of the axle. A well balanced vehicle is the result and while the preferred embodiment has been shown and described, it is desired to be limited only by the spirit of the invention and scope of the appended claims.

Having thus described the invention what I claim as new and desire to secure by Letters Patent is:

1. A cart of the kind specified comprising a wheel and axle unit; a bed to receive the article being carted; framework on the said unit for mounting the bed in an inclined position, said bed having the framework swingably secured thereto for collapsing into substantially the same plane therewith, said framework having a normally horizontal portion, and a normally vertical portion diverging from a point of attachment with the axle of the said unit; and common means for securing the framework to the axle and securing together the proximal ends of said portions, said vertical portion having laterally extending stub pins thereon, said horizontal portion having open end tubular members for receiving said stub pins.

2. A cart of the kind specified comprising a wheel and axle unit; a bed to receive the article being carted; and framework on the said unit for mounting the bed in an inclined position, said framework including a normally horizontal portion, and a normally vertical portion, diverging from a point of attachment with the axle to points of pivotal connection with the bed, and means for releasably securing the framework to the axle of the unit, said means comprising stub pins on the axle, tubular members forming a part of the framework for telescopically receiving the pins, and a manually releasable member joining the framework and the axle for holding the pins in said tubular members.

3. A cart of the kind specified comprising a wheel and axle unit; a bed to receive the article being carted; framework on the said unit for mounting the bed in an inclined position, said framework being V-shaped with the free ends thereof hingedly secured to the bed; and common means for clamping together the proximal ends of the arms of the V-shaped framework and clamping together said framework and the axle of the said unit for quick disassembly and to permit swinging of the arms into substantially the same plane as the bed, said means comprising stub pins on the axle and on one leg of said framework, tubular members forming a part of said one leg for telescopically receiving the pins on said axle, tubular members forming a part of the other leg of said framework for telescopically receiving the pins on said one leg, and a manually releasable member joining the axle and said other leg of the framework for holding all of said pins within their respective tubular members.

WILLIAM QUIRING.

REFERENCES CITED

The following references are of record in the file of this patent:

UNITED STATES PATENTS

| Number | Name | Date |
|---|---|---|
| 1,722,193 | Brandon | July 23, 1929 |
| 1,965,943 | Lea | July 10, 1934 |
| 2,236,053 | Caron | Mar. 25, 1941 |
| 2,345,458 | Caron | Mar. 28, 1944 |
| 2,383,587 | Boughton | Aug. 28, 1945 |
| 2,395,275 | Jackson | Feb. 19, 1946 |
| 2,415,334 | Brown | Feb. 4, 1947 |

FOREIGN PATENTS

| Number | Country | Date |
|---|---|---|
| 418,701 | Great Britain | Oct. 30, 1934 |